Patented Oct. 1, 1946

2,408,536

UNITED STATES PATENT OFFICE 2,408,536

PROTHROMBIN PRODUCT AND PROCESS FOR PREPARATION OF SAME

Harry P. Smith, Iowa City, Iowa, assignor to Parke, Davis & Company, Detroit, Mich., a corporation of Michigan No Drawing. Original application April 29, 1940, Serial No. 332,397. Divided and this application June 22, 1942, Serial No. 448,034

7 Claims. (Cl. 167—74)

The invention relates to the preparation of antithrombin-free prothrombin which is an intermediate product useful in the preparation of highly active thrombin preparations capable of effective use in clotting blood.

This application is a division of my Patent No. 2,398,077, issued April 9, 1946, in which the thrombin preparations and processes for obtaining the same are claimed.

Heretofore it has been proposed to treat oxalated plasma with an adsorbent such as magnesium hydroxide for the purpose of adsorbing prothrombin from other substances present in the plasma. Such prothrombin preparations, like the thromboplastin preparations previously known, contain considerable amounts of antithrombins which are present in all blood and which act, even in traces, to quickly destroy thrombin.

I have found that when there is more than a certain minimum of antithrombin or other non-prothrombin plasma substances present, that magnesium hydroxide will adsorb the antithrombins along with the desired prothrombin. I have further found that by first treating the plasma or like prothrombin solution to remove therefrom a sufficient amount of antithrombins and/or associated non-prothrombin substances, it is thereafter possible to use magnesium hydroxide and like adsorbents to preferentially adsorb the prothrombin, while leaving the last traces of antithrombin in solution. In this manner, the invention makes it possible for the first time to remove all of the antithrombin substances and obtain absolutely antithrombin-free prothrombin which is also free from calcium. Although this calcium-free prothrombin is preferred, especially as an intermediate product for the preparation of antithrombin-free thrombin, my new antithrombin-free prothrombin containing calcium is readily obtained simply by adding a calcium compound or salt to the calcium-free antithrombin-free prothrombin.

An important feature of my new process for obtaining antithrombin-free prothrombin, as described herein, is that it definitely excludes the use of calcium compounds. If calcium compounds are used, there is always great danger that the prothrombin will be converted into thrombin before the antithrombins can be completely separated, especially since tissue extract, thromboplastin, is always present in blood or plasma in sufficient quantities for this transformation to occur. Such a premature conversion of prothrombin into thrombin would give a thrombin product containing antithrombins. The action of the latter in destroying the former occurs so rapidly that such a thrombin preparation could have no practical utility.

I have also found that prothrombin is inactivated by thrombin, analogous to the known inactivation of trypsinogen by trypsin. Thus, in a process for obtaining prothrombin wherein use is made of calcium compounds, it is always to be expected that some of the prothrombin will be converted into thrombin which is then capable of inactivating large quantities or even all of the remaining prothrombin.

My invention avoids the difficulties and failure inherent in other methods and gives a new intermediate product which is very useful in the preparation of pure thrombin, namely, antithrombin-free prothrombin, and preferably antithrombin-free prothrombin which is also calcium-free. By the use of such a new intermediate I am also able to provide a new therapeutically and commercially useful potency-standardized and antithrombin-free thrombin of high clotting activity and stability.

*Example.—Preparation of prothrombin*

One part of 1.85% potassium oxalate solution is thoroughly mixed with 3 parts of freshly drawn ox blood. The oxalated plasma is obtained by centrifugation. The plasma is diluted to 10 times its volume with distilled water and its acidity adjusted to a pH of about 5.2–5.4, preferably pH 5.3, with 1% acetic acid. A pH less than 5 is to be avoided because it results in destruction of the prothrombin. After adjusting the pH, the plasma is allowed to stand 2 hours or more and the precipitate separated by decanting and then centrifuging the mixture.

The precipitate is suspended in oxalated saline (0.075% potassium oxalate in 0.86% NaCl) using about one-sixteenth of the volume of the original plasma with no adjustment of the pH. That is, about 200 cc. for each gallon of original plasma. The large bulky residue which remains undissolved is centrifuged off and discarded. The supernatant liquid is a solution of prothrombin which contains antithrombins. It is further purified as follows:

A magnesium hydroxide suspension in water is made containing about 8 to 10 grams of magnesium hydroxide (dry weight) per 100 cc. of suspension. This magnesium hydroxide suspension can be made by adding 25 cc. of concentrated ammonium hydroxide to 100 cc. of 20% magnesium chloride, decanting and washing the precipitate several times with water, centrifugalizing and suspending the packed precipitate in 30 cc. of saline. To 6 liters of prothrombin solution, preliminarily purified as described above, there is added with stirring 10 or 15 cc. of the magnesium hydroxide suspension. The presence of magnesium compound causes any fibrinogen in the prothrombin to precipitate, and it is removed mechanically as a stringy mass. There is no significant loss of prothrombin in this step.

After removing the fibrin, 1 liter of the magnesium hydroxide suspension is added if the prothrombin solution assays 750 units per cc. More of the suspension is added if the solution assays more than 750 units of prothrombin per cc. The number of units of prothrombin per cc. can be estimated by the method described below.

If too much magnesium hydroxide is used, the final product will contain too much inactive protein. On the other hand, if insufficient magnesium hydroxide is used, the yield of prothrombin will be greatly reduced. About 8000 units of prothrombin are adsorbed by a suspension of 0.085 grams (dry weight) of magnesium hydroxide. This quantity of magnesium hydroxide is preferably suspended in about 1 cc. of aqueous suspension.

The supernatant of the adsorption mixture is siphoned off and centrifuged from the magnesium hydroxide with its adsorbed prothrombin. The latter is then suspended in a volume of water equal to that of the original $Mg(OH)_2$ suspension, placed in a pressure vessel and shaken with carbon dioxide under pressure until no further carbon dioxide is used up. Usually this takes about 10 or 15 minutes. It is necessary to avoid heating by too rapid adsorption of $CO_2$ and failure to shake the suspension.

The decomposition of the magnesium hydroxide adsorbent with $CO_2$ under pressure has at least two important advantages. It reduces the volume of water in which the $Mg(OH)_2$ can be suspended and thus cuts down on the volume subsequently submitted to dialysis. For example, at ordinary pressures the equivalent of 10 cc. of $Mg(OH)_2$ would have to be suspended in 60-70 cc. of water, whereas it can be decomposed by suspending in 10 cc. of water if one works at 60 pounds of $CO_2$ pressure. This is very important for making large quantities of prothrombin. However, $CO_2$ at ordinary pressures may be used, even though the results are not as satisfactory. The other advantage is the rapidity with which decomposition takes place under pressure.

After desorbing the prothrombin with $CO_2$ it is present in the solution which is then dialyzed against water. The dialysis is continued until the ionic concentration is such that a precipitate will be produced by acetic acid at about pH 5.3. The concentration of magnesium ion at this point is probably below 0.005 M.

After the dialysis is complete, which may require a day or two, the prothrombin solution may contain some precipitated impurities which are centrifuged off or otherwise removed. The dialyzed prothrombin solution is then precipitated with acetic acid. I prefer to first dilute the prothrombin before adding the acetic acid. Usually distilled water is added to dilute it about 3 times. Enough acetic acid may be used to give a pH of about 5.3 and cause precipitation of practically all of the prothrombin. However, I find it advantageous to fractionally precipitate by first bringing the pH to about 5.65, centrifuging off the precipitate and then bringing the pH of the supernatant to about 5.3. The second precipitate at pH 5.3 contains less inert protein than the first precipitate. In any case, either of the precipitates, or all of them, can be used for conversion into the new thrombin product, since the prothrombin precipitates are of very high potency and are antithrombin-free.

The product of this example is gray in appearance, gives the common protein color tests and a strong positive orcinol reaction for carbohydrate. It is very soluble in water and saline. It has a potency of about 2000 or more units of prothrombin per milligram of nitrogen. Stated in another way, one cc. of a solution of the product containing 1 mg. of nitrogen will clot 2000 cc. or more of purified fibrinogen solution in 15 seconds. See the definition of a unit of prothrombin given below.

One unit of prothrombin can be defined as that amount which, when completely converted into thrombin, will clot 1 cc. of fibrinogen solution in 15 seconds. It must be kept in mind that this definition of a unit of prothrombin requires that the prothrombin and also the thromboplastin used for converting it into thrombin are antithrombin-free, otherwise the thrombin produced will be inactivated by antithrombins as fast as it is formed from the prothrombin. Since I have obtained for the first time antithrombin-free thromboplastin and prothrombin, it is apparent that these new intermediate products make possible for the first time an accurate quantitative control of the potency of prothrombin and thrombin preparations. This definition of a unit of prothrombin requires complete conversion to thrombin. This can only be assured by a leisurely conversion which requires that the thromboplastin and prothrombin be free from antithrombins.

Similarly, one unit of thrombin is defined as that amount of thrombin which will cause the clotting of 1 cc. of fibrinogen solution in 15 seconds.

What I claim as my invention is:

1. Process for the preparation of antithrombin-free prothrombin from a plasma product containing prothrombin and antithrombin which comprises removing by isoelectric precipitation sufficient antithrombins from the plasma product to enable magnesium hydroxide to preferentially adsorb prothrombin from antithrombin and thereafter adsorbing and separating the prothrombin away from antithrombin.

2. Process for the preparation of antithrombin-free prothrombin from a plasma product containing prothrombin and antithrombin which comprises removing sufficient impurities from the plasma product to enable the prothrombin to be adsorbed preferentially away from the antithrombin, thereafter treating the preliminarily purified prothrombin with the optimum quantity of magnesium hydroxide to adsorb the prothrombin, separating the magnesium hydroxide and its adsorbed prothrombin from unadsorbed antithrombin, eluting the prothrombin from the adsorbent by reacting carbonic acid with the magnesium hydroxide to dissolve the latter, dialyzing the resulting solution of prothrombin to remove magnesium and other ions until the dialyzed solution will form a precipitate at about pH 5.3, acidifying the solution to produce said pH and separating the antithrombin-free prothrombin.

3. The steps which comprise adsorption of prothrombin onto magnesium hydroxide from a solution of a plasma derived prothrombin product from which substantial quantities of antithrombins and associated impurities have previously been removed by isoelectric precipitation at a pH between about pH 5 and pH 5.65, and, after said adsorption, separating the magnesium hydroxide and its adsorbed prothrombin from unadsorbed antithrombins and impurities and finally separating the adsorbed prothrombin from the magnesium hydroxide.

4. The steps which comprise adsorption of prothrombin onto magnesium hydroxide from a solution of a plasma derived prothrombin product from which substantial quantities of antithrombins and associated impurities have previously been removed by isoelectric precipitation at a pH of about 5.3, and, after said adsorption, separating the magnesium hydroxide and its adsorbed prothrombin from unadsorbed antithrombins and impurities and finally separating the adsorbed prothrombin from the magnesium hydroxide.

5. The steps which comprise adsorption of prothrombin onto magnesium hydroxide from a solution of a plasma derived prothrombin product from which substantial quantities of antithrombins and associated impurities have previously been removed by isoelectric precipitation at a pH between about pH 5 and pH 5.65, and, after said adsorption, separating the magnesium hydroxide and its adsorbed prothrombin from unadsorbed antithrombins and impurities, eluting the prothrombin from the adsorbent by reacting carbonic acid with the magnesium hydroxide to dissolve the latter, dialyzing the resulting solution of prothrombin to remove magnesium and other ions until the dialyzed solution will form a precipitate at about pH 5.3, acidifying the solution to produce said pH and separating the antithrombin-free prothrombin.

6. The steps which comprise adsorption of prothrombin onto magnesium hydroxide from a solution of a plasma derived prothrombin product from which substantial quantities of antithrombins and associated impurities have previously been removed by isoelectric precipitation at a pH between about pH 5 and pH 5.65, and, after said adsorption, separating the magnesium hydroxide and its adsorbed prothrombin from unadsorbed antithrombins and impurities, eluting the prothrombin from the adsorbent by reacting carbonic acid under pressure with the magnesium hydroxide to dissolve the latter, dialyzing the resulting solution of prothrombin to remove magnesium and other ions until the dialyzed solution will form a precipitate at about pH 5.3, acidifying the solution to produce said pH and separating the antithrombin-free prothrombin.

7. Prothrombin, derived from blood plasma, free from thrombin, calcium compounds and antithrombin substances, which is very soluble in water and saline solution, possesses a potency of at least 2000 units of prothrombin per mg. of nitrogen, and is an intermediate product useful in the preparation of a highly active thrombin capable of effective use in clotting blood.

HARRY P. SMITH.